United States Patent [19]
Cherry et al.

[11] Patent Number: 5,858,432
[45] Date of Patent: Jan. 12, 1999

[54] METHODS FOR SHIPPING BROCCOLI WITHOUT ICE

[75] Inventors: Joe H. Cherry, Dadeville, Ala.;
Howard S. Kravitz, Wayne, Pa.;
Hesham A. Gawad, Fresno, Calif.;
Robert R. Sargert, San Diego, Calif.

[73] Assignee: EPL Technologies, Inc., Philadelphia, Pa.

[21] Appl. No.: 823,522

[22] Filed: Mar. 24, 1997

Related U.S. Application Data

[63] Continuation-in-part of Ser. No. 640,114, Apr. 3, 1996, abandoned, which is a continuation of Ser. No. 319,450, Oct. 6, 1994, abandoned.

[51] Int. Cl.$^6$ ....................................................... A23B 7/14
[52] U.S. Cl. .......................... 426/262; 426/268; 426/270; 426/310; 426/321; 426/324
[58] Field of Search ................................... 426/262, 268, 426/269, 321, 310, 324, 331, 270

[56] References Cited

U.S. PATENT DOCUMENTS

| | | | |
|---|---|---|---|
| 3,814,820 | 6/1974 | Busta et al. | 426/262 |
| 4,937,085 | 6/1990 | Cherry et al. | 426/269 |
| 4,988,523 | 1/1991 | Gardner et al. | 426/268 |
| 5,126,153 | 6/1992 | Beck | 426/269 |
| 5,316,778 | 5/1994 | Hougham | 426/324 |
| 5,346,712 | 9/1994 | Cherry et al. | 426/321 |
| 5,389,389 | 2/1995 | Beck | 426/269 |
| 5,421,138 | 6/1995 | Muise et al. | 53/440 |

FOREIGN PATENT DOCUMENTS

WO96/10920   4/1996   WIPO.

*Primary Examiner*—Milton Cano
*Attorney, Agent, or Firm*—Woodard, Emhardt, Naughton Moriarty & McNett

[57] ABSTRACT

A method for inhibiting the deterioration of processed fresh broccoli during shipment, comprising the steps of processing the broccoli for fresh consumption and exposing the processed broccoli to a solution of sodium citrate, ascorbic acid, sodium acid pyrophosphate, and L-cysteine hydrochloride, and water in which the sodium citrate, ascorbic acid, sodium acid pyrophosphate, and L-cysteine hydrochloride have been diluted to a combined weight percentage concentration of from about 1.00 to about 1.21 weight percent of the solution, vacuum cooling the processed broccoli, and shipping the processed broccoli after the vacuum cooling step without packing the processed broccoli in ice, the exposing step including contacting the processed broccoli with a sufficient amount of the solution such that the contacting inhibits the deterioration of the processed broccoli when the processed broccoli is exposed to an atmosphere during the shipping step that would result in the deterioration of the processed broccoli in the absence of the contacting and in the absence of ice packing.

7 Claims, 9 Drawing Sheets

METHODS FOR SHIPPING BROCCOLI WITHOUT ICE

This application is a continuation-in-part of application Ser. No. 08/640,114, filed Apr. 3, 1996, now abanding, which is a continuation of application Ser. No. 08/319,450, filed Oct. 6, 1994, now abandoned.

This invention relates generally to methods for inhibiting the deterioration of mechanically and physiologically injured fruits and vegetables, and relates more particularly to a method for inhibiting the deterioration of minimally processed fresh broccoli during shipment without packing and shipping the broccoli in ice.

BACKGROUND OF THE INVENTION

The majority of the broccoli grown in the United States is grown in California and Arizona. Of the estimated 3 billion pounds of broccoli that are marketed in the United States each year, about 1 billion pounds are minimally processed soon after harvest and are shipped fresh, ready for consumption. The fresh broccoli market in the United States consists of two segments: (1) whole broccoli crowns and bunch broccoli (about 700 million pounds yearly) and (2) broccoli florets (about 300 million pounds yearly). A broccoli crown is a single 4 or 5 inch stalk, typically of the Marathon variety, with lateral stems trimmed off. The head of a broccoli crown is typically a very even mushroom shape and tightly packed flower buds, which are ideally deep green in color, tight and consistent. Bunch broccoli is a group of broccoli stalks, typically of the Arcadia variety, with lateral stalks trimmed off, which are held together with a rubber band or twist tie. Florets are broccoli buds that have been trimmed from a stalk. About 280 million pounds of the broccoli crowns and bunch broccoli market are shipped within the United States each year, and about 420 million pounds are exported The floret market is primarily within the United States. About 300 million pounds of florets are shipped to food service providers and retailers each year.

Quality aspects that are among the most prized in fresh broccoli is a deep green color, dense and compact heads, tight flowers, few laterals, and minimal cut end darkening. While whole, unprocessed broccoli may be stored under refrigeration for many weeks without significant deterioration, minimally processed fresh broccoli that has been in refrigerated storage for as little as a week will become pale green, the florets will begin to turn yellow, and the cut ends will begin to brown.

The rate at which deterioration of minimally processed fresh broccoli occurs is also a function of the physiological condition of the broccoli prior to the harvesting and processing, the chemical treatments that are applied to the broccoli during processing, if any, and the humidity levels and the temperatures at which the fresh broccoli is stored. For example, florets are washed and cooled in chlorinated water. This is the only chemical treatment in use today. Variations in the physiology of the whole, unprocessed heads of broccoli caused by different degrees of environmental stress during the growing season, such as heat stress and drought stress, will also result in variations in the onset of deterioration when the broccoli is processed and stored under a given set of storage conditions. Broccoli that is grown in poorly irrigated fields tends to degrade more rapidly after processing than does broccoli that is grown in well-irrigated fields, for example.

In addition, broccoli has a very high respiration rate that results in the generation of heat. This heat of respiration can contribute to the rate of deterioration of the broccoli during shipment, especially in the center portions of the typical box of fresh broccoli crowns, bunch broccoli or florets, or in the center of a pallet.

Color deterioration of broccoli is unsightly and unappetizing. As a result, consumers invariably associate discoloration with distastefully old broccoli, even though the taste and nutritional value of the fresh broccoli are not affected by the appearance of discoloration. Therefore, the appearance of discoloration leads to significant commercial waste if the processed fresh broccoli is discarded before taste and nutrition are affected.

To date the discoloration and other aspects of deterioration of minimally processed fresh broccoli, and the contributing heat of respiration, have been controlled primarily by packing and shipping freshly harvested broccoli in ice. Many broccoli processors and shippers place minimally processed fresh broccoli in water-resistant, shipping boxes containing about twenty to twenty-four pounds of broccoli crowns or about forty pounds of broccoli florets and then cover the broccoli with ice. The costs of water-resistant boxes and ice, as well as the additional shipping weight added by the ice packing, results in significant added costs for shipping fresh, minimally processed broccoli from the field to the market.

SUMMARY OF THE INVENTION

It is a principal object of the present invention to provide new methods for shipping freshly harvested and minimally processed broccoli that effectively inhibit the onset of discoloration and other aspects of deterioration for a reasonably long period of time consistent with commercial requirements without packing and shipping the broccoli in ice. The new methods of the present invention thereby eliminate not only the costs of water-resistant boxes and ice, but also the additional costs associated with the additional shipping weight added by the ice packing, which heretofore have resulted in significant added costs for shipping fresh, minimally processed broccoli from the field to the market. The new methods of the present invention utilize safe and natural chemicals that are effective in such low concentrations that they do not impart an off-odor or taste to the processed fresh broccoli to which they are applied.

One embodiment of the present invention is a method for inhibiting the deterioration of processed fresh broccoli during shipment, comprising the steps of processing the broccoli for fresh consumption and exposing the processed broccoli to a solution of sodium citrate, ascorbic acid, sodium acid pyrophosphate, L-cysteine hydrochloride and water in which the sodium citrate, ascorbic acid, sodium acid pyrophosphate, and L-cysteine hydrochloride have been diluted to a combined weight percentage concentration of from about 1.00 to about 1.21 weight percent of the solution; vacuum cooling the processed broccoli; and shipping the processed broccoli after the vacuum cooling step without packing the processed broccoli in ice, with the exposing step including contacting the processed broccoli with a sufficient amount of the solution such that the contacting inhibits the deterioration of the processed broccoli when the processed broccoli is exposed to an atmosphere during the shipping step that would result in the degradation of the processed broccoli in the absence of the contacting and in the absence of ice packing.

Another embodiment of the present invention is a method for inhibiting the deterioration of processed fresh broccoli during shipment, comprising the steps of processing the broccoli for fresh consumption and exposing the processed broccoli to a solution of sodium citrate, ascorbic acid, sodium acid pyrophosphate, and L-cysteine hydrochloride, in weight percentage ratios ranging from about 59.60 to about 72.00 parts sodium citrate, from about 14.40 to about 17.88 parts ascorbic acid, from about 7.60 to about 12.58 parts sodium acid pyrophosphate, and from about 6.00 to about 9.94 parts L-cysteine hydrochloride, and the remainder water until the sodium citrate, ascorbic acid, sodium acid pyrophosphate, and L-cysteine hydrochloride have been diluted to a combined weight percentage concentration of from about 1.00 to about 1.21 weight percent of the solution; vacuum cooling the processed broccoli; and shipping the processed broccoli after the vacuum cooling step without packing the processed broccoli in ice, the exposing step including contacting the processed broccoli with a sufficient amount of the solution such that the contacting inhibits the deterioration of the processed broccoli when the processed broccoli is exposed to an atmosphere during the shipping step that would result in the deterioration of the processed broccoli in the absence of the contacting and the absence of ice packing.

Related objects and advantages of the present invention will be evident from the following description of the preferred embodiments.

DESCRIPTION OF THE PREFERRED EMBODIMENTS

For the purposes of promoting an understanding of the principles of the invention, reference will now be made to the preferred embodiments in the description and examples that follow, and specific language will be used to describe the same. It will nevertheless be understood that no limitation of the scope of the invention is thereby intended, such alterations and further modifications in the preferred embodiments, and such further applications of the principles of the invention as described therein being contemplated as would normally occur to one skilled in the art to which the invention relates.

The broccoli utilized in the following examples was acquired directly from broccoli processors in California immediately after harvest.

EXAMPLES 1–3

A formulation of about 72.0% by weight food grade sodium citrate, about 14.4% by weight ascorbic acid, about 7.6% by weight sodium acid pyrophosphate and about 6.0% by weight L-cysteine hydrochloride was dissolved in ambient tap water (10 ppm chloride) to a final test solution concentration of about 1.0% by weight and a final pH of about 6.0.

On Day 1, 192 boxes of broccoli crowns, representing four pallets, were harvested. Ninety-six (96) boxes, each containing about twenty to twenty-four pounds of broccoli crowns, totaling two pallet loads, were each sprayed with a total of about 4 ounces of the test solution per box as the broccoli crowns were being harvested and boxed in the fields of a California broccoli processor One pallet load of the treated broccoli and one pallet load of untreated broccoli were placed into a vacuum tube where the broccoli was cooled to 40° F. over a 45-minute dwell time. The California processor handled the second pallet load of treated broccoli and a second pallet load of untreated broccoli in its normal manner: these pallets were moved to a cooler and the boxes of broccoli were iced.

Four boxes from each of the aforementioned four pallets were then placed on a single pallet in preparation for shipment. This single test pallet load, consisting of four boxes that were treated with the test solution and were vacuum-cooled, four boxes that were treated with the test solution and were iced, four boxes that were not treated and were vacuum-cooled, and four boxes that were not treated and were iced (hereinafter collectively subgroups), was moved into the California processor's cooler and was left there overnight in temperatures ranging from between 35° to 37° F.

Early on the morning of Day 2, the single test pallet was shipped by refrigerated truck to a Los Angeles produce terminal. The test pallet was off-loaded from the refrigerated truck and was immediately placed in a refrigerated warehouse at a temperature of about 35° F. On the morning of Day 3, the test pallet was loaded onto a second refrigerated truck at about 35° F. for transport to Lexington, Ky.

The single test pallet arrived in Lexington, Ky. on the morning of Day 6, and was delivered to The Department of Nutrition and Food Science at the University of Kentucky. One box from each of the four subgroups on the single test pallet was opened upon arrival for analytical evaluations, and was re-closed for subsequent storage. Two boxes from each subgroup, including the opened boxes, were put into storage at about 42° F., and the remaining two boxes from each subgroup were put into storage at about 50° F.

University of Kentucky staff conducted sensory and analytical evaluations of the boxed broccoli in all four subgroups over the following 8 days. The results of the sensory evaluations are set forth in the following tables.

TABLE 1

Sensory Evaluations/Day 14/42° F. Storage
Criteria Measurements - Scale:
Highly Acceptable (Fresh Equivalent) 0; Acceptable 1; Marginally
Acceptable 2; Marginally Unacceptable 3; Highly Unacceptable 4.

| TREATMENT - SPRAY | NONE | 1% | NONE | 1% |
|---|---|---|---|---|
| AMOUNT - | NONE | 4 OUNCES | NONE | 4 OUNCES |
| COOLING - | ICE | ICE | VACUUM | VACUUM |
| RATINGS: FLOWER BUDS | | | | |
| Appearance - color: green, yellowing | 1 | 1 | 1 | 1 |
| Appearance - compactness of head | 1 | 0 | 2 to 3 | 1 |
| Texture - crispness, firmness, similar to fresh, or rubbery if old | 0 | 0 to 1 | 0 to 1 | 1 to 2 |
| Aroma - similar to fresh, off-aroma, pungent if old | 1 | 0 to 1 | 0 to 1 | 0 to 1 |
| Microbial - sliming, visual rotting, characteristics of breakdown | 0 | 0 to 1 | 0 | 0 |
| RATINGS: STALK | | | | |
| Appearance - color - green, white | 2 to 3 brown micro spots | 1 laterals clear | 1 to 2 moderate discolor - laterals | 1 to 2 moderate discolor - laterals |
| Appearance - color of cut - discoloration of end - whitish/green or gray or brown | 1 to 2 | 1 to 2 | 1 | 1 |
| Texture - crispness, firmness, similar to fresh, or rubbery if old | 1 | 1 | 1 | 1 |
| OVERALL RATING | 1 to 2 | 1 | 1 to 2 | 1 |

TABLE 2

Sensory Evaluations/Day 14/50° F. Storage/Box 1
Criteria Measurements - Scale:
Highly Acceptable (Fresh Equivalent) 0; Acceptable 1; Marginally
Acceptable 2; Marginally Unacceptable 3; Highly Unacceptable 4.

| TREATMENT - SPRAY | NONE | 1% | NONE | 1% |
|---|---|---|---|---|
| AMOUNT - | NONE | 4 OUNCES | NONE | 4 OUNCES |
| COOLING - | ICE | ICE | VACUUM | VACUUM |
| RATINGS: FLOWER BUDS | | | | |
| Appearance - color: green, yellowing | 3 to 4 | 3 to 4 | 3 to 4 | 3 to 4 yellowing |
| Appearance - compactness of head | 1 | 1 | 2 to 3 | 2 to 3 |
| Texture - crispness, firmness, similar to fresh, or rubbery if old | 3 | 1 | 2 | 1 |
| Aroma - similar to fresh, off-aroma, pungent if old | 0 | 1 | 1 to 2 | 1 |
| Microbial - sliming, visual rotting, characteristics of breakdown | 3 | 2 | 2 to 3 | 3 |
| RATINGS: STALK | | | | |
| Appearance - color: green, white | 2 to 3 light: laterals discolored | 2 lateral discolored | 2 to 3 | 2 to 3 |
| Appearance - color of cut - discoloration of end - whitish/green or gray or brown | 2 to 3 | 2 to 3 | 2 some discolor | 1 to 2 mild discolor - laterals |
| Texture - crispness, firmness, similar to fresh, or rubbery if old | 0 | 0 | 0 | 0 |
| OVERALL RATING | 3 to 4 | 2 to 3 | 2 to 3 | 3 |

TABLE 3

Sensory Evaluations/Day 14/50° F. Storage/Box 2
Criteria Measurements - Scale:
Highly Acceptable (Fresh Equivalent) 0; Acceptable 1; Marginally
Acceptable 2; Marginally Unacceptable 3; Highly Unacceptable 4.

| TREATMENT - SPRAY | NONE | 1% | NONE | 1% |
|---|---|---|---|---|
| AMOUNT - | NONE | 4 OUNCES | NONE | 4 OUNCES |
| COOLING - | ICE | ICE | VACUUM | VACUUM |
| RATINGS: FLOWER BUDS | | | | |
| Appearance - color: green, yellowing | 1 to 2 | 3 | 2 to 3 | 1 to 2 |
| Appearance - compactness of head | 2 | 1 to 2 | 3 | 2 |
| Texture - crispness, firmness, similar to fresh, or rubbery if old | 2 to 3 | 2 | 2 to 3 | 1 to 2 |

TABLE 3-continued

Sensory Evaluations/Day 14/50° F. Storage/Box 2
Criteria Measurements - Scale:
Highly Acceptable (Fresh Equivalent) 0; Acceptable 1; Marginally
Acceptable 2; Marginally Unacceptable 3; Highly Unacceptable 4.

| TREATMENT - SPRAY | NONE | 1% | NONE | 1% |
|---|---|---|---|---|
| AMOUNT - | NONE | 4 OUNCES | NONE | 4 OUNCES |
| COOLING - | ICE | ICE | VACUUM | VACUUM |
| Aroma - similar to fresh, off-aroma, pungent if old | 0 | 1 | 1 to 2 | 1 |
| Microbial - sliming, visual rotting, characteristics of breakdown RATINGS: STALK | 3 | 2 | 2 to 3 | 3 |
| Appearance - color: green, white | 1 to 2 some spotting - micro | 1 to 2 brown micro spots | 1 to 2 | 1 to 2 |
| Appearance - color of cut - discoloration of end - whitish/green or gray or brown | 2 to 3 | 2 | 2 | 1 to 2 |
| Texture - crispness, firmness, similar to fresh, or rubbery if old | 0 | 0 | 0 | 0 |
| OVERALL RATING Salability | 2 | 2 to 3 | 2 to 3 | 2 |

Overall, the broccoli crowns treated with the test solution, both with and without ice packing, stored at 42° F. had the best overall sensory ratings. At 50° F., the sensory results were mixed, due to the significant differences in the Box 1 and Box 2 results (compare Tables 2 and 3). Storing the broccoli crowns at 42° F. was realistic, whereas storing the broccoli at 50° F. was on the cusp of being abusive. Also, even though Examples 1–3 contained four subgroups, the comparison of the untreated/iced subgroup with the treated/vacuum-cooled subgroup was the key comparison that supports the present claim of invention.

Temperature was the deciding factor in the differences noted in the retention of flower color. In a comparison of the different subgroups, the colors of the treated/vacuum-cooled samples in each storage condition were the same as the untreated/iced controls.

At 42° F., the broccoli crowns that were packed in ice tended to have better flower compactness than those without ice. Generally, broccoli crowns stored at 42° F. tended to have better flower compactness than broccoli crowns stored at 50° F. In one of the evaluations at 50° F., the treated/vacuum-cooled broccoli crowns were comparable to the untreated/iced.

At 42° F., broccoli crown flowers packed in ice appeared tighter than those not packed in ice. However, at 50° F., the treated broccoli crown flowers were in better shape than the untreated broccoli crown flowers, whether or not they were packed in ice.

The untreated broccoli crowns stored at 50° F. had excellent aroma (none). All other broccoli crowns were not quite as good, but all broccoli crowns were rated very acceptable in this regard.

When stored at 42° F., all of the broccoli crowns had low, but quite acceptable Levels of microbial growth on their flowers. At 50° F., however, the untreated broccoli crowns and the treated broccoli crowns without ice packing were marginally unacceptable. At 50° F., only the treated broccoli crowns packed in ice were acceptable, and they were only marginally acceptable.

Included within the evaluation of the color of the broccoli stalk (not to be confused with the color of the cut end) were the color of the stalk surface and the lateral cuts. The treated/vacuum-cooled broccoli crowns were better than the untreated/iced broccoli crowns at 42° F. At 50° F., these two subgroups were comparable.

At 50° F., the color of the stalk cut surface on the treated/vacuum-cooled broccoli crowns consistently was the most acceptable. The untreated/iced broccoli crowns were on the cusp between marginally acceptable and marginally unacceptable, while the treated/vacuum-cooled broccoli crowns were rated acceptable to marginally acceptable. At 42° F., all broccoli crowns were acceptable to marginally acceptable.

All of the broccoli crowns were judged quite acceptable in texture, crispness, and firmness of the stalks, whether stored at the higher or lower storage temperature.

The conclusions to be drawn from the sensory results of Examples 1–3 are that broccoli crowns treated with the test solution of the above Examples and shipped without being packed in ice were in as good as or in better condition after 14 days than were the untreated broccoli crowns that had been shipped packed in ice.

The broccoli crowns of Box 1 (Table 2) stored at 50° F., which had lower sensory evaluations than the broccoli crowns of Box 2 (Table 3) also stored at 50° F., were evaluated analytically by University staff. The results of the analytical evaluations are graphically demonstrated in FIGS. 1–8. In FIGS. 1–8, the test solution is referenced as BF. The comparisons made in FIGS. 1–6 are between untreated broccoli shipped in ice (the control) and broccoli treated with test solution and vacuum-cooled (two of the four subgroups described in Examples 1–3).

Figure 1:
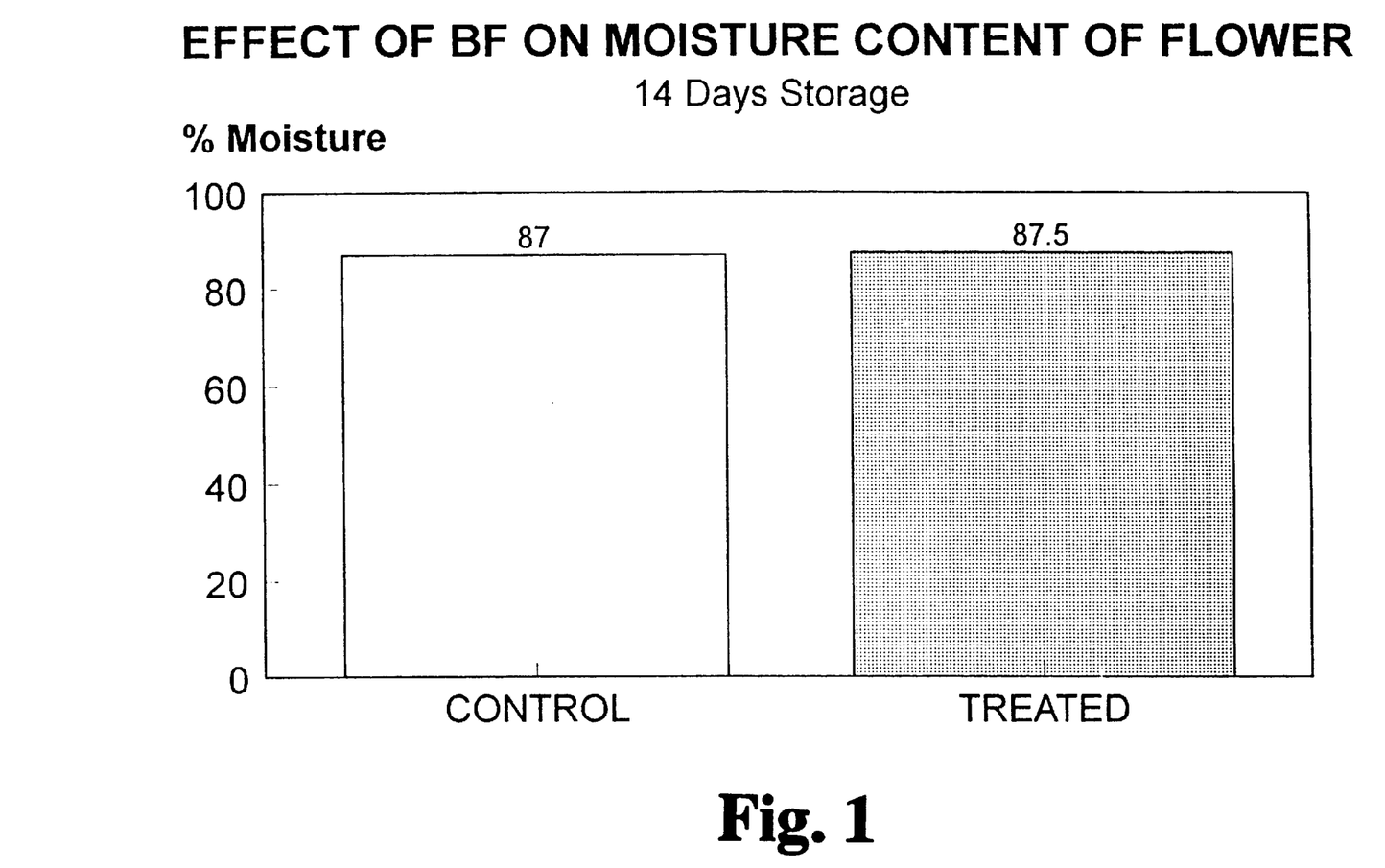
FIG. 1 is a chart entitled Effect of BF on Moisture Content of Flower.

Referring to FIG. 1, the level of moisture in the flowers of both the treated (BF) and untreated broccoli was judged to be equal at 14 days, suggesting that the level of crispness of the broccoli in each case would be similar. The broccoli flowers that had been packed in ice had higher moisture content over the first 7 days due to the fact that they were bathed in ice and water from melting ice. However, crispness of the flowers and compactness of the heads were found to be excellent for both broccoli groups.

Figure 2:
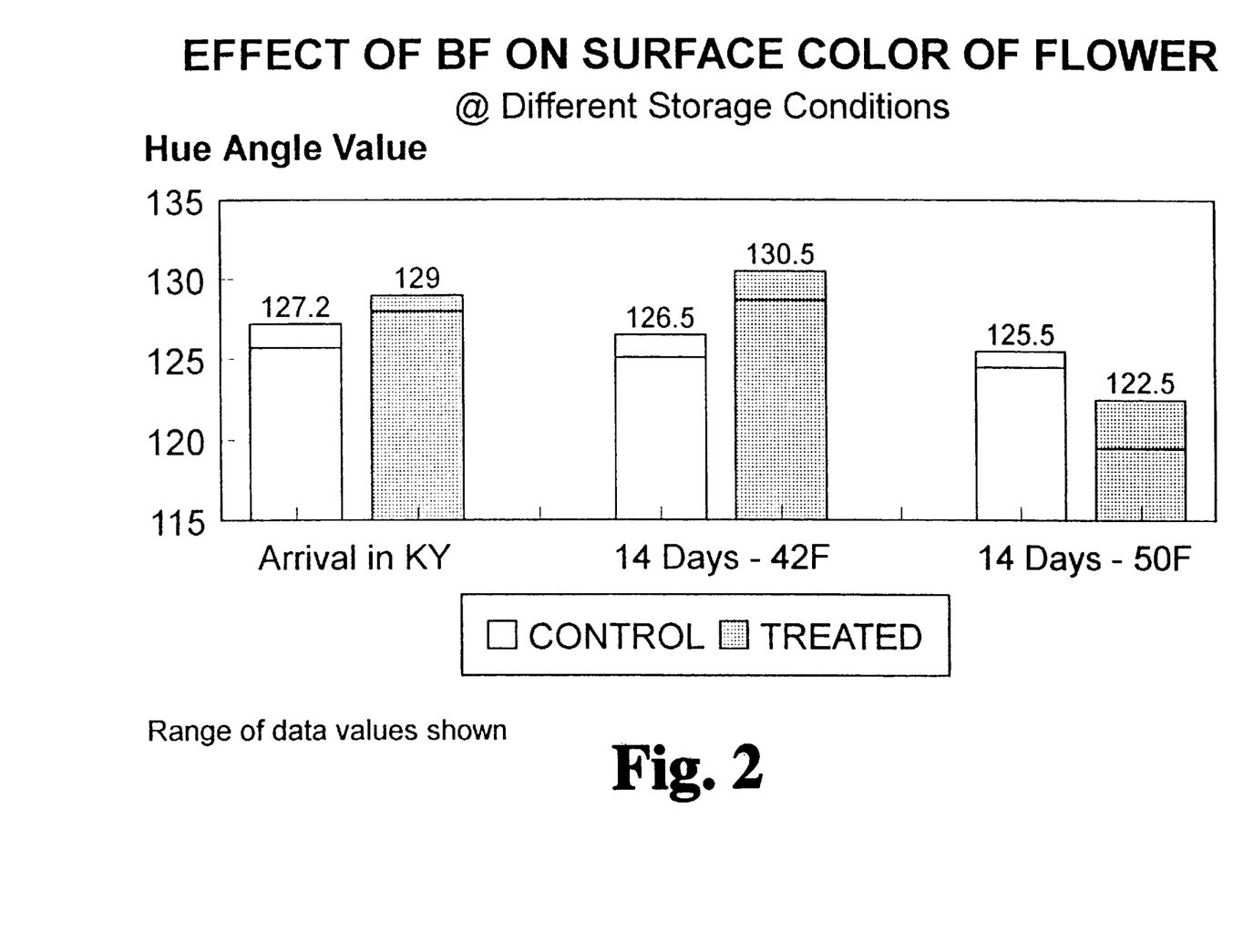
FIG. 2 is a chart entitled Effect of BF on Surface Color of Flower.

Referring now to FIG. 2, storage temperature played an important role in color retention of the broccoli flowers, as measured by hue angle. Higher storage temperatures reduced hue angles. At the lower storage temperature of 42° F., the color retention (hue angle) was higher for the treated/vacuum-cooled samples. The results were reversed at the higher storage temperature of 50° F. However, as noted above, the sensory analysis of the color retention of Box 1 (Table 2) from which samples for analytical analysis were taken, was lower than that for Box 2 (Table 3), which was also stored at 50° F.

Figure 3:
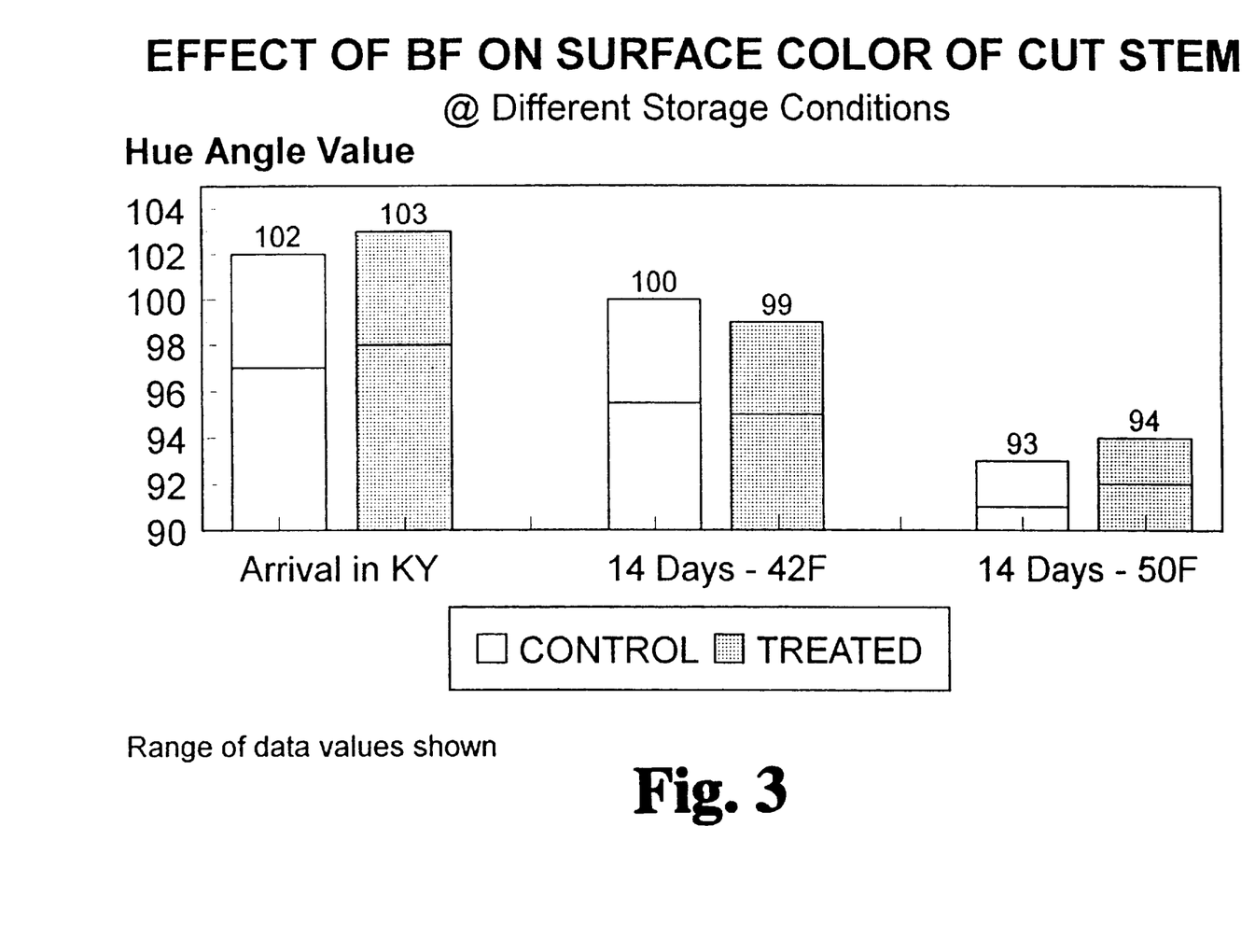
FIG. 3 is a chart entitled Effect of BF on Surface Color of Cut Stem.

Referring now to FIG. 3, storage temperature played a role in the color retention of the cut surface of the stem as measured by hue angle. Higher storage temperature resulted in the loss of color. In the case of storage at 42° F., the treated broccoli had comparable color retention values to the untreated control broccoli. This was also the result at the higher storage temperature of 50° F. A more meaningful result demonstrating the differences in color of cut stalk was the measurement of polyphenol oxidase (PPO) activity, graphically depicted in FIG. 6. PPO is the principal enzyme involved in the browning reaction. Treated broccoli samples consistently (in the aggregate and separately) showed reduced levels of PPO compared to their untreated counterparts.

Figure 4:
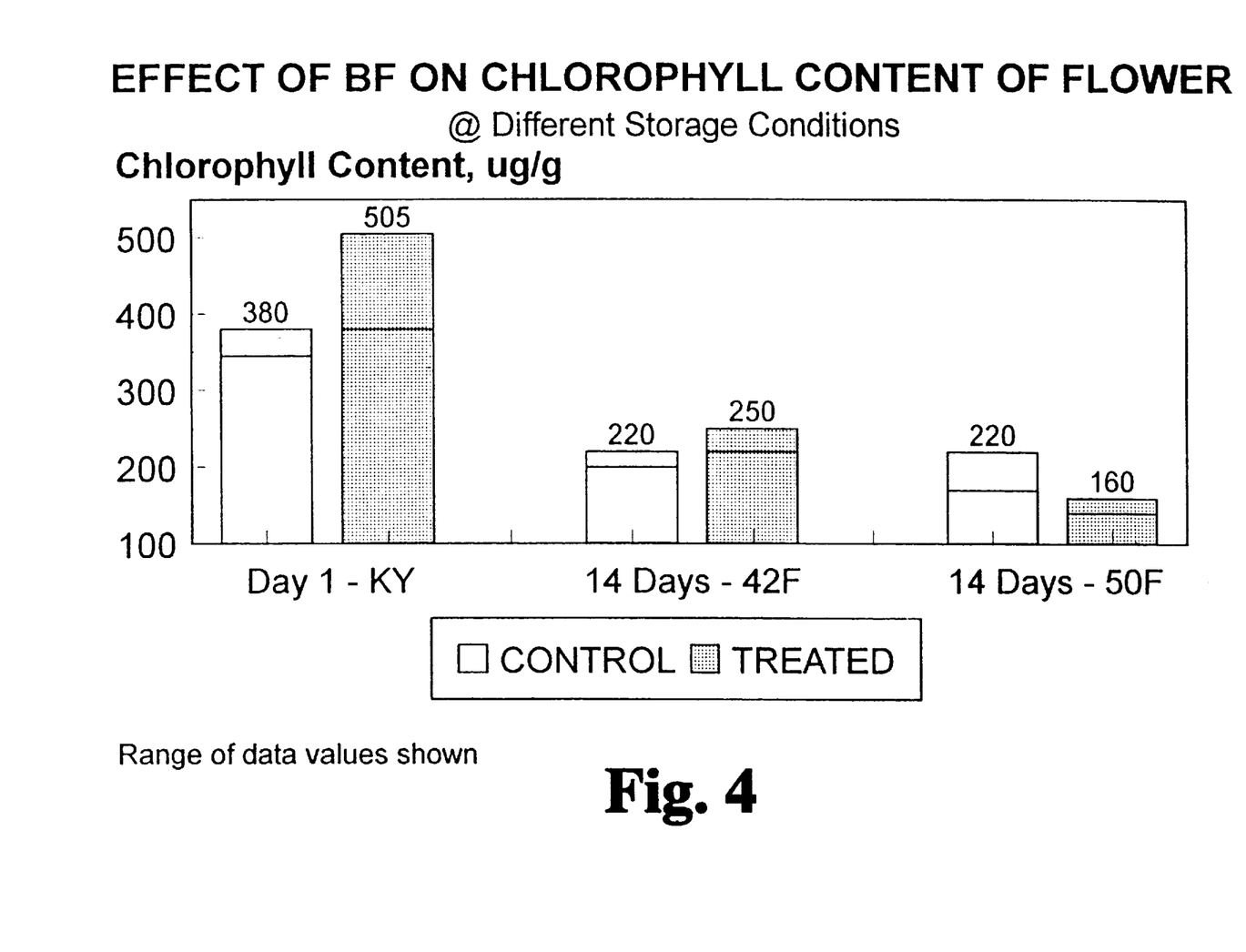
FIG. 4 is a chart entitled Effect of BF on Chlorophyll Content of Flower.
Figure 5:
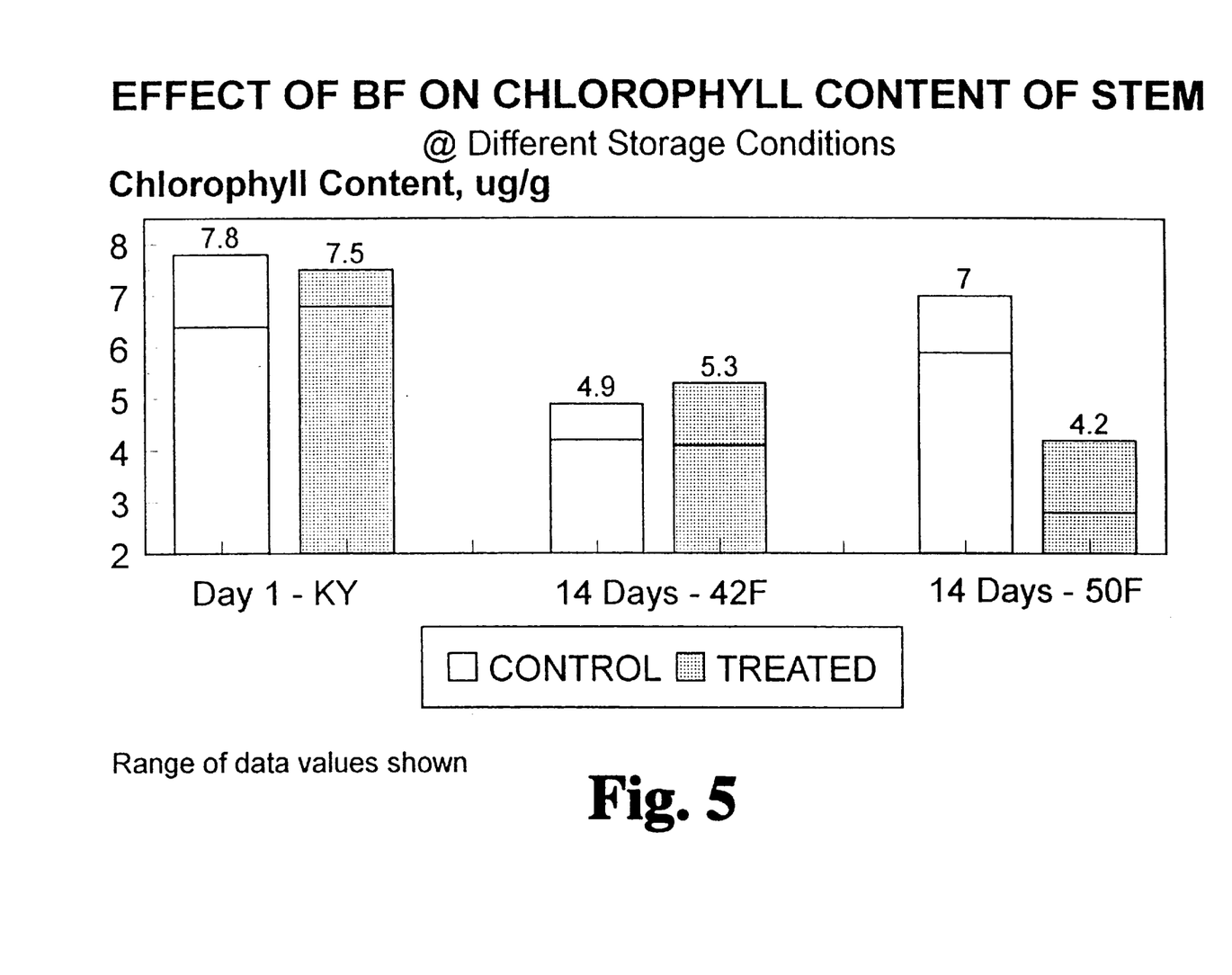
FIG. 5 is a chart entitled Effect of BF on Chlorophyll Content of Stem.
Figure 6:
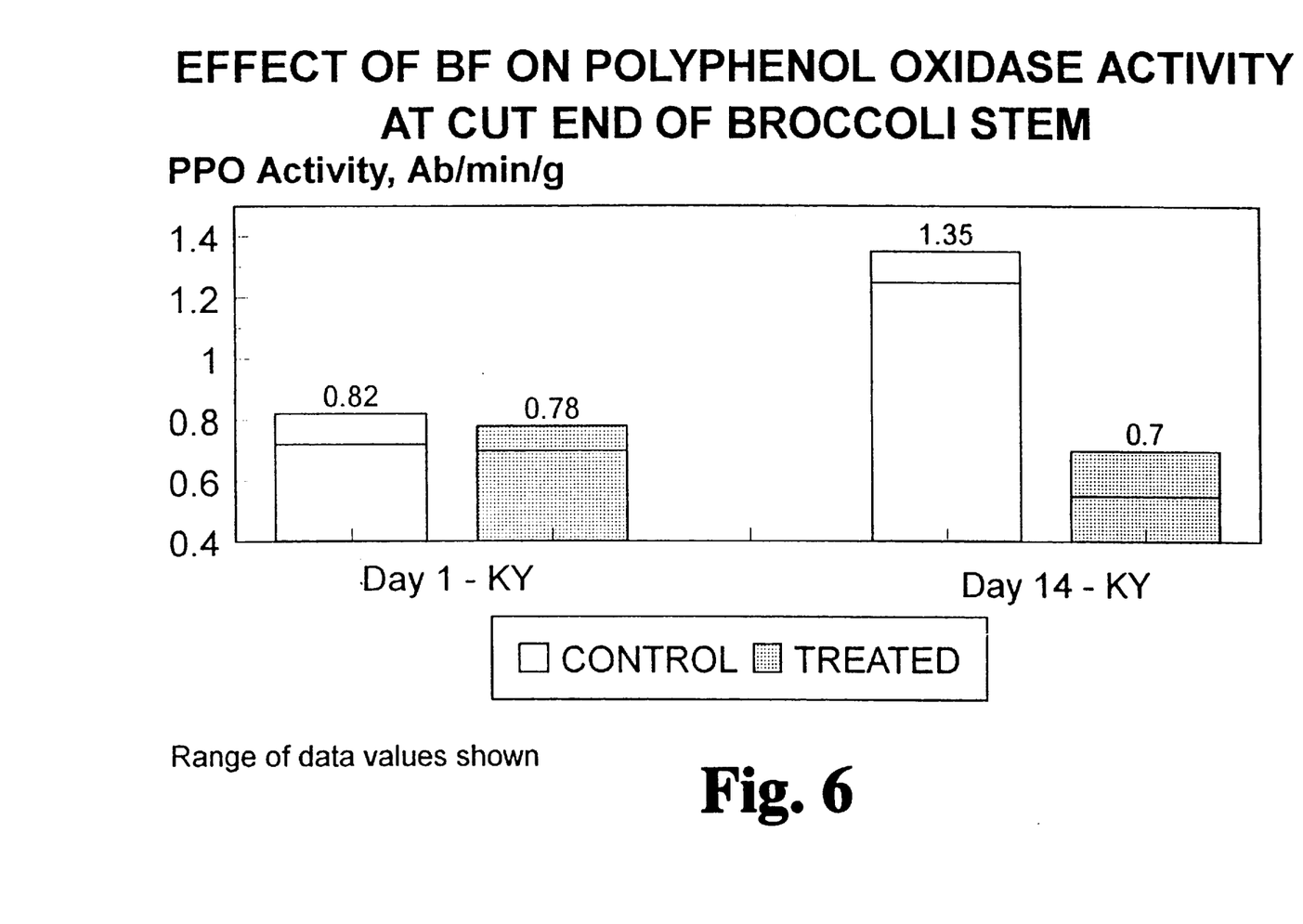
FIG. 6 is a chart entitled Effect of BF on Polyphenol Oxidase Activity.

Referring now to FIGS. 4–5, an analytical measurement of the level of greenness is the level of chlorophyll in the broccoli. At 42° F. storage, the amount of chlorophyll in both the flower and the stem was higher for the treated broccoli. At 50° F. storage, the results were reversed, but again, the sensory analysis of the color retention of Box 1 (Table 2) from which samples for analytical analysis were taken, was lower than that for Box 2 (Table 3), which was also stored at 50° F.

Figure 7:
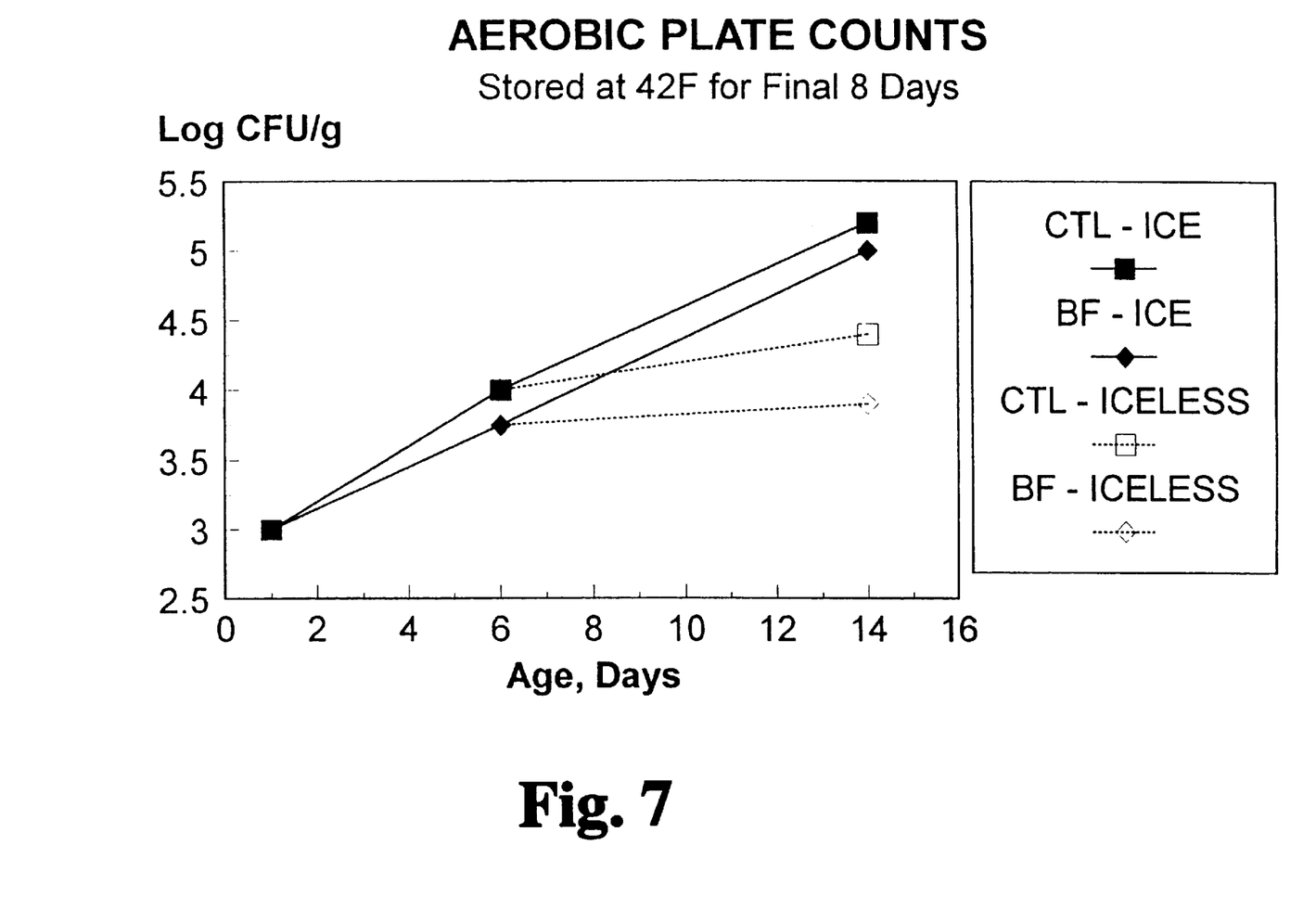
FIG. 7 is a chart entitled Aerobic Plate Counts.
Figure 8:
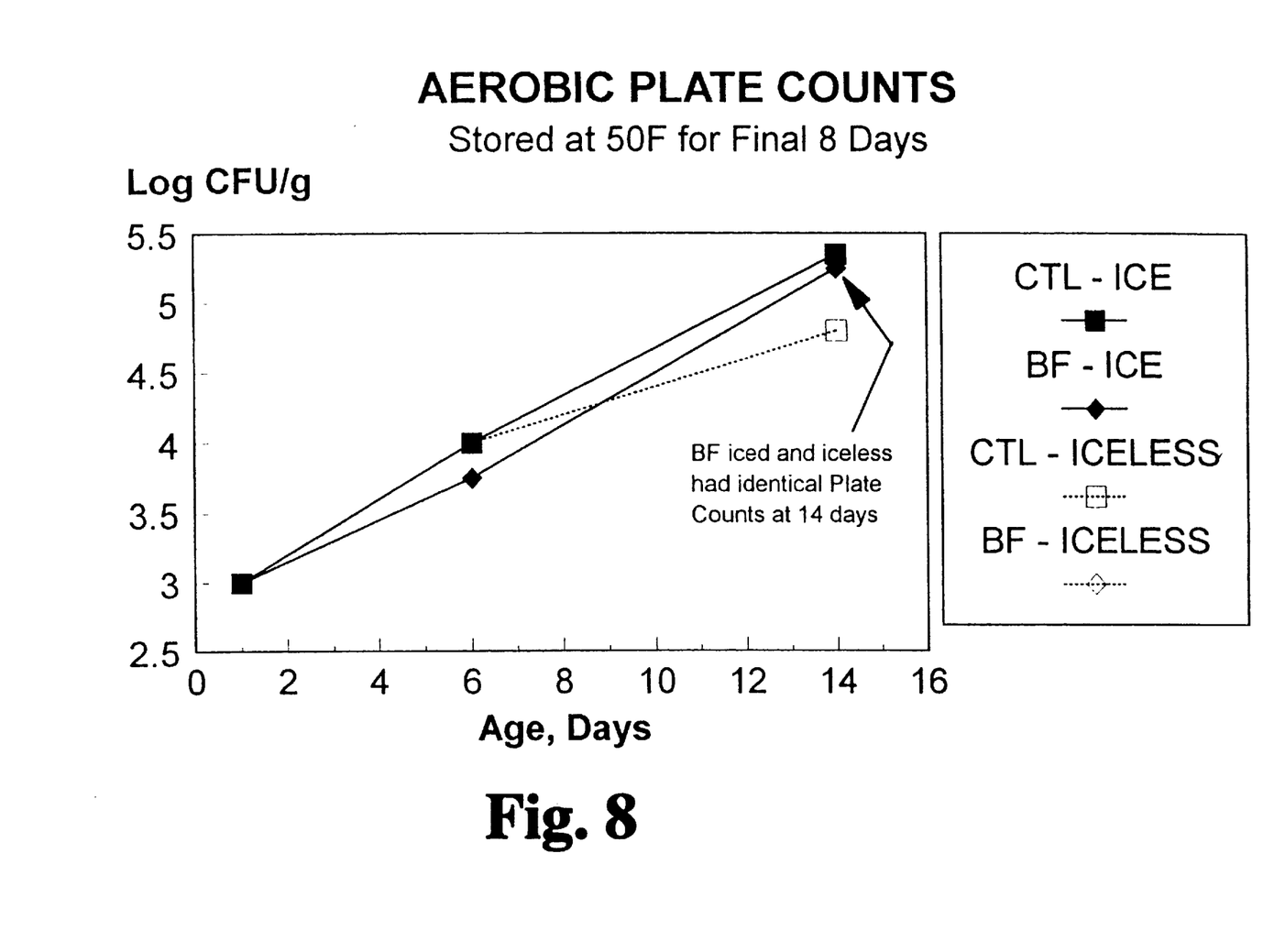
FIG. 8 is a chart entitled Aerobic Plate Counts.

Referring now to FIGS. 7–8, in general, broccoli packed in ice had higher aerobic plate counts than did the vacuum-cooled broccoli samples. An important advantage was seen in the treated/vacuum-cooled broccoli samples that were stored at 42° F. over the untreated/vacuum-cooled samples and over both the treated/iced and untreated/iced samples.

In summary, the results of the experiments of Examples 1–3 completed to date provide clear supporting evidence favoring the utilization of the test solution and method of the Examples to treat processed broccoli crowns for shipment without the traditional ice packing.

EXAMPLES 4–5

A formulation of about 59.60% by weight food grade sodium citrate, about 17.88% by weight ascorbic acid, about 12.58% by weight sodium acid pyrophosphate and about 9.94% by weight L-cysteine hydrochloride was dissolved in ambient tap water (10 ppm chloride) to a final test solution concentration of about 1.21% by weight and a final pH of about 6.0.

On Day 1, broccoli florets were field harvested in the fields of a California broccoli processor and three groups of broccoli florets were spray treated with three different quantities of the test solution as the broccoli florets were being harvested and boxed in the fields of a California broccoli processor. About forty pounds of florets were packed in each box. Control boxes were left untreated and were split into two groups, one that was vacuum-cooled and one that was cooled by packing the boxes with ice. In summary, the test boxes were grouped as follows: (1) untreated/iced (the standard production); (2) untreated/vacuum-cooled; (3) spray treated with 4 ounces of the test solution per box/vacuum-cooled; (4) spray treated with 8 ounces of the test solution per box/vacuum-cooled; and (5) spray treated with 12 ounces of the test solution per box/vacuum-cooled.

The treated boxes and one of the two groups of control boxes were placed in a vacuum tube where the broccoli was vacuum-cooled to about 40° F. over a 45-minute dwell time. The other group of control boxes was moved into a cooler and the boxes were packed with ice. All boxes were then moved into a warehouse cooler for storage at about 36° to 38° F. for two weeks.

Storage and sensory evaluations were conducted in the warehouse cooler 1 and 2 weeks after harvest and the processing described above. The results of the sensory evaluations are set forth in the following tables.

TABLE 4

Sensory Evaluations/Day 7/36°–38° F. Storage
Criteria Measurements - Scale:
Highly Acceptable (Fresh Equivalent) 0; Acceptable 1; Marginally Acceptable 2; Marginally Unacceptable 3; Highly Unacceptable 4.

| TREATMENT SPRAY | NONE | NONE | 1.21% | 1.21% | 1.21% |
|---|---|---|---|---|---|
| AMOUNT - COOLING - | NONE ICE | NONE VACUUM | 4 OUNCES VACUUM | 8 OUNCES VACUUM | 12 OUNCES VACUUM |
| RATINGS: FLOWER BUDS | | | | | |
| Appearance color: green, yellowing | 1 | 1 | 1 | 2 | 1 |
| Appearance compactness of head | 1 | 3 | 1 | 1 | 1 |
| Taste; similar to fresh flavor | 1 | — | 1 | 1 | 2 |
| Texture - crispness, firmness, similar to fresh, or rubbery if old | 1 | 3/wilted | 1.5 | 1 | 1 |
| Aroma - similar to fresh, off-aroma, pungent if old | 0 | 0 | 0 | 0 | 0 |
| Microbial - sliming, visual rotting, characteristics of breakdown | 0 | 0 | 0 | 0 | 0 |
| RATINGS: | | | | | |

TABLE 4-continued

Sensory Evaluations/Day 7/36°–38° F. Storage
Criteria Measurements - Scale:
Highly Acceptable (Fresh Equivalent) 0; Acceptable 1; Marginally
Acceptable 2; Marginally Unacceptable 3; Highly Unacceptable 4.

| TREATMENT SPRAY | NONE | NONE | 1.21% | 1.21% | 1.21% |
|---|---|---|---|---|---|
| AMOUNT - COOLING - | NONE ICE | NONE VACUUM | 4 OUNCES VACUUM | 8 OUNCES VACUUM | 12 OUNCES VACUUM |
| STALK | | | | | |
| Appearance - color - green, white | 1 | 2 | 1 | 2/drying | 2/drying |
| Texture - crispness, firmness, similar to fresh, or rubbery if old | 1 | 3 | 1 | 2 | 3/wilted |
| OVERALL RATING | 1 | 3 | 1.25 | 2 | 2 |

TABLE 5

Sensory Evaluations/Day 14/36°–38° F. Storage
Criteria Measurements - Scale:
Highly Acceptable (Fresh Equivalent) 0; Acceptable 1; Marginally
Acceptable 2; Marginally Unacceptable 3; Highly Unacceptable 4.

| TREATMENT SPRAY | NONE | NONE | 1.21% | 1.21% | 1.21% |
|---|---|---|---|---|---|
| AMOUNT - COOLING - | NONE ICE | NONE VACUUM | 4 OUNCES VACUUM | 8 OUNCES VACUUM | 12 OUNCES VACUUM |
| RATINGS: FLOWER BUDS | | | | | |
| Appearance color: green, yellowing | 2 | 2 | 2 | 2 | 2 |
| Appearance compactness of head | 2 | 3 | 3 | 2 | 2 |
| Taste; similar to fresh flavor | 1 | 1 | 2 | 1 | 1 |
| Texture - crispness, firmness, similar to fresh, or rubbery if old | 3/wilted | 3/wilted | 3/wilted | 2 | 2 |
| Aroma - similar to fresh, off-aroma, pungent if old | 0 | 0 | 0 | 0 | 0 |
| Microbial - sliming, visual rotting, characteristics of breakdown | — | — | — | — | — |
| RATINGS: STALK | | | | | |
| Appearance - color - green, white | 2 | 3 | 2 | 2 | 2.5 |
| Texture - crispness, firmness, similar to fresh, or rubbery if old | 2 | 3 | 2 | 2 | 2 |
| OVERALL RATING | 2 | 2.5 | 2.33 | 1.83 | 2.08 |

Overall, in the sensory analyses at 7 and 14 days, the broccoli florets that were treated with from 4 to 8 ounces of the test solution of Examples 4–5 per box were rated as good as or better than the untreated broccoli florets that were packed in ice. The untreated/vacuum-cooled broccoli florets were unacceptable All of the broccoli florets were essentially comparable at 7 and 14 days in the color of their flowers. The flower compactness of the untreated/vacuum-cooled broccoli florets was unacceptable on Day 7. At Day 14, the compactness of the flowers that had been treated with about 4 ounces of the test solution per box was unacceptable. All other flowers were acceptable at Day 7, or marginally acceptable at Day 14.

By Day 7, the untreated/vacuum-cooled broccoli floret flowers had wilted. At Day 14, the untreated/iced broccoli floret flowers had also wilted, as had the flowers of the broccoli florets that had been treated with about 4 ounces of the test solution per box. All other floret flowers were marginally acceptable in texture and crispness.

Microbial growth on the broccoli floret flowers was not apparent on Day 7, or on Day 14.

Some drying of the stalks and laterals was noted on Day 7 on the untreated/vacuum-cooled broccoli florets and on the florets that had received the two highest amounts of the test solution. On Day 14, the untreated/vacuum-cooled broccoli florets had unacceptable color of the broccoli the test solution of Examples 4–5 at between 4 and 8 ounces per box and that were vacuum-cooled and not packed in ice are in as good as or better condition in terms of sensory and bacterial analyses than the untreated broccoli florets that were packed in ice in the conventional fashion.

The treatment methods of the present invention therefore provide new methods for shipping freshly harvested and minimally processed broccoli that effectively inhibit the onset of discoloration and other aspects of deterioration for a reasonably long period of time consistent with commercial requirements without packing and shipping the broccoli in ice. The new methods of the present invention thereby reducing the costs of water-resistant boxes and eliminating the need for ice. Also saved are the additional costs that are associated with the additional shipping weight added by the ice packing, which heretofore have resulted in significant added costs for shipping fresh, minimally processed broccoli from the field to the market. Also, the profile of each shipping box may be reduced since no ice will be need in the box. A lower box profile means that more boxes could be placed on each pallet and therefore on each load. For example, the number of boxes per pallet could be increased from the present 48 boxes per pallet to 54 boxes per pallet, representing a 12.5 percent increase.

The new methods of the present invention also utilize safe and natural chemicals that are effective in such low stalks and laterals, and the florets that had received the highest amounts of the test solution were between marginally acceptable and unacceptable.

On Day 7, the texture, crispness and firmness of the stalks of the untreated/vacuum-cooled broccoli florets were unacceptable. Also at Day 7 it was noted that the sensory ratings in this category of the treated florets decreased as the amount of the test solution applied increased. This trend moderated by Day 14, when the untreated/iced florets and the treated florets were rated as essentially equals in this category.

All of the broccoli florets had acceptable taste or marginally acceptable taste at Days 7 and 14. All of the broccoli florets were fresh smelling at Days 7 and 14.

Figure 9:
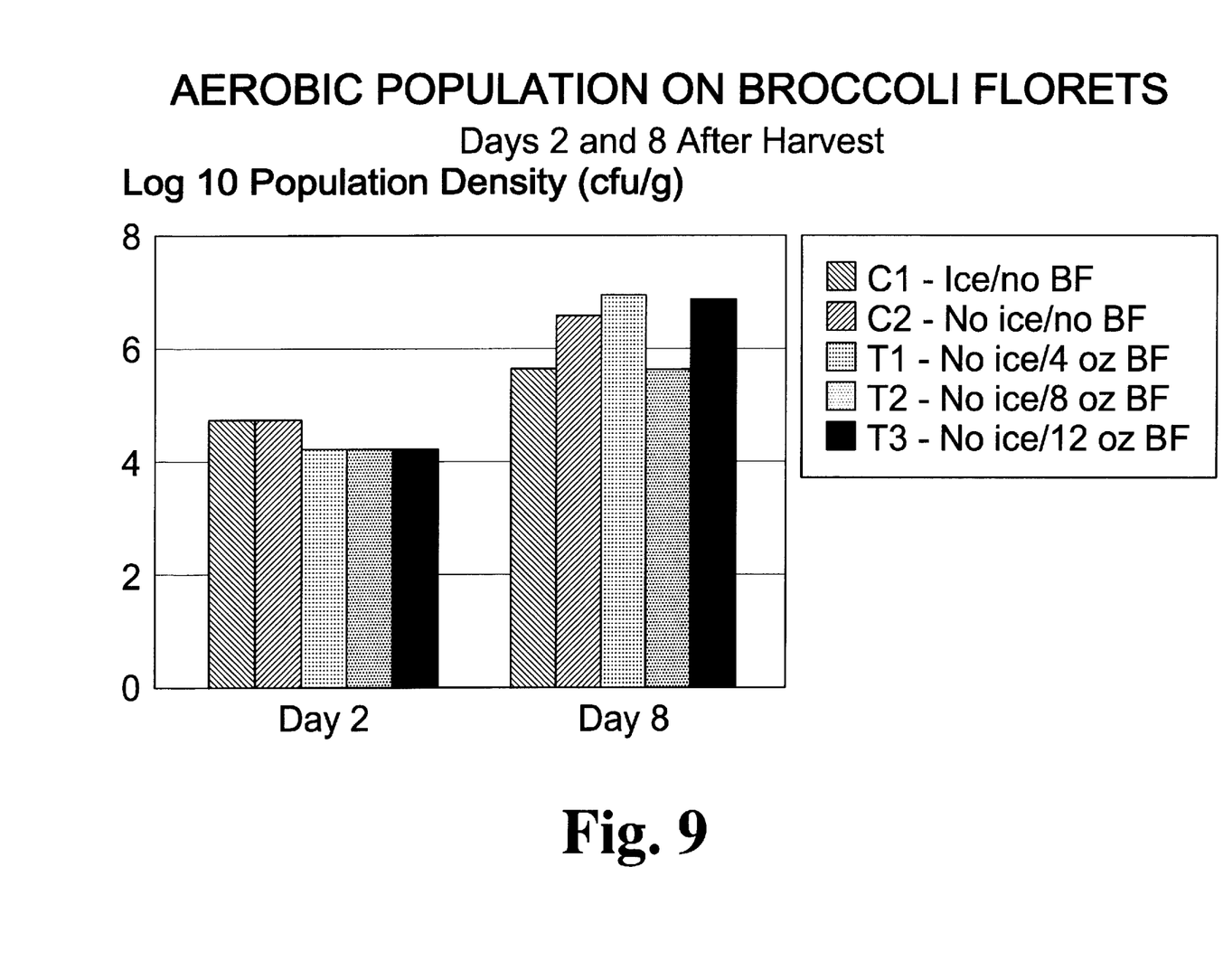
FIG. 9 is a chart entitled Aerobic Population of Broccoli Florets.

Analytical analysis for aerobic bacteria counts on the broccoli florets of Examples 4 and 5 was conducted on the test groups on Day 2 and Day 8 after harvest. Referring now to FIG. 9, starting levels of bacteria (Day 2) were essentially equivalent (less than one log difference) for all of the florets. Similarly at Day 8, levels of bacteria were only one log different between samples; however, the untreated/iced florets and the vacuum-cooled florets that had been treated with 8 ounces of the test solution per box were lowest in plate counts, and were rated equal.

In summary, the conclusions to be drawn from the sensory and analytical results set forth in Tables 4–5, above, and in FIG. 9, are that broccoli florets treated with concentrations that they do not impart an off-odor or taste to the processed fresh broccoli to which they are applied.

While the invention has been described in the Examples and descriptions, above, the same is to be considered as illustrative and not restrictive in character, it being understood that only the preferred embodiments have been described and that all changes and modifications that come within the spirit of the invention are desired to be protected.

For example, the solutions utilized in the methods of the present invention may be contacted with minimally processed fresh broccoli crowns and florets in conventional ways, such as by dipping, spraying or showering. Spraying has been the preferred method in testing to date, as set forth in the above Examples.

Also, in work completed to date it has been noted that variations on broccoli physiology caused by different environmental stresses during the growing period, such as different degrees of elevated heat stress and drought stress will show higher levels of dehydration at different storage and transport conditions, which may require slight modifications to the solutions utilized in the methods of the present invention to prevent the onset of deterioration of broccoli that is transported without any ice packing. For example, broccoli that was grown in poorly irrigated fields tend to dehydrate more rapidly than broccoli that was grown in well irrigated fields.

Variations in the physiologies of broccoli crowns and florets from different growing regions, and differences in the environmental stresses experienced by the broccoli as a whole prior to processing, will also require slight modifications in the methods set forth in the above examples to most efficiently inhibit the onset of deterioration of the broccoli during iceless transport.

We claim:

1. A method for inhibiting the yellowing of broccoli flowers, the loss of chlorophyll in broccoli stalks, and the respiration of processed fresh broccoli during shipment, comprising the steps of processing the broccoli for fresh consumption, exposing the processed broccoli to a solution of sodium citrate, ascorbic acid, sodium acid pyrophosphate, and L-cysteine hydrochloride, and water in which the sodium citrate, ascorbic acid, sodium acid pyrophosphate, and L-cysteine hydrochloride have been diluted to a combined weight percentage concentration of from about 1.00 to about 1.21 weight percent of the solution, vacuum cooling the processed broccoli after said exposing step, and shipping the processed broccoli after said vacuum cooling step without packing the processed broccoli in ice, said exposing step including contacting the processed broccoli with a sufficient amount of the solution such that said contacting step inhibits the yellowing of broccoli flowers, the loss of chlorophyll in broccoli stalks, and the respiration of the processed broccoli when the processed broccoli is exposed to an atmosphere during said shipping step that would result in the yellowing of broccoli flowers, the loss of chlorophyll in broccoli stalks, and an increase in respiration of the processed broccoli in the absence of said contacting step and in the absence of ice packing the processed broccoli.

2. A method for inhibiting the yellowing of broccoli flowers, the loss of chlorophyll in broccoli stalks, and the respiration of processed fresh broccoli during shipment, comprising the steps of processing the broccoli for fresh consumption, exposing the processed broccoli to a solution of sodium citrate, ascorbic acid, sodium acid pyrophosphate, and L-cysteine hydrochloride, in weight percentage ratios ranging from about 59.60 to about 72.00 parts sodium citrate, from about 14.40 to about 17.88 parts ascorbic acid, from about 7.60 to about 12.58 parts sodium acid pyrophosphate, and from about 6.00 to about 9.94 parts L-cysteine hydrochloride, and the remainder water until the sodium citrate, ascorbic acid, sodium acid pyrophosphate, and L-cysteine hydrochloride have been diluted to a combined weight percentage concentration of from about 1.00 to about 1.21 weight percent of the solution, vacuum cooling the processed broccoli after said exposing step, and shipping the processed broccoli after said vacuum cooling step without packing the processed broccoli in ice, said exposing step including contacting the processed broccoli with a sufficient amount of the solution such that said contacting step inhibits the yellowing of broccoli flowers, the loss of chlorophyll in broccoli stalks, and the respiration of the processed broccoli when the processed broccoli is exposed to an atmosphere during said shipping step that would result in the yellowing of broccoli flowers, the loss of chlorophyll in broccoli stalks, and an increase in respiration of the processed broccoli in the absence of said contacting step and the absence of ice packing the processed broccoli.

3. The method for inhibiting the deterioration of processed fresh broccoli during shipment of claim 2 wherein the broccoli of said processing step is broccoli crowns and the solution of said exposing is of sodium citrate, ascorbic acid, sodium acid pyrophosphate, and L-cysteine hydrochloride, in weight percentage ratios at about 72.0 parts sodium citrate, about 14.4 parts ascorbic acid, about 7.6 to parts sodium acid pyrophosphate, and about 6.00 parts L-cysteine hydrochloride, and the remainder water until the sodium citrate, ascorbic acid, sodium acid pyrophosphate, and L-cysteine hydrochloride have been diluted to a combined weight percentage concentration of about 1.00 weight percent of the solution.

4. The method for inhibiting the deterioration of processed fresh broccoli during shipment of claim 2 wherein the broccoli of said processing step is broccoli florets and the solution of said exposing is of sodium citrate, ascorbic acid, sodium acid pyrophosphate, and L-cysteine hydrochloride, in weight percentage ratios at about 59.60 parts sodium citrate, about 17.88 parts ascorbic acid, about 12.58 to parts sodium acid pyrophosphate, and about 9.94 parts L-cysteine hydrochloride, and the remainder water until the sodium citrate, ascorbic acid, sodium acid pyrophosphate, and L-cysteine hydrochloride have been diluted to a combined weight percentage concentration of about 1.21 weight percent of the solution.

5. The method for inhibiting the deterioration of processed fresh broccoli during shipment of claim 3 wherein the contacting of said exposing step includes spraying the solution on the processed broccoli crowns at a rate of about 4 ounces of the solution per about twenty to twenty-four pounds of the processed broccoli crowns.

6. The method for inhibiting the deterioration of processed fresh broccoli during shipment of claim 4 wherein the contacting of said exposing step includes spraying the solution on the processed broccoli florets at a rate of about 4 to about 12 ounces of the solution per about forty pounds of the processed broccoli florets.

7. The method for inhibiting the deterioration of processed fresh broccoli during shipment of any one of claims 1 to 6 wherein the shipping step includes refrigerating the processed broccoli during the shipping step from between about 35° F. to about 50° F.

* * * * *

UNITED STATES PATENT AND TRADEMARK OFFICE
CERTIFICATE OF CORRECTION

PATENT NO : 5,858,432
DATED : January 12, 1999
INVENTOR(S) : Joe H. Cherry et al.

It is certified that error appears in the above-identified patent and that said Letters Patent is hereby corrected as shown below:

In column 1, line 5, please change "abanding" to --abandoned --.

In column 1, line 35, please insert a period after "exported".

In column 8, line 2, please change "Levels" to --levels--.

In column 13, line 27, please insert text from Column 13, line 53, beginning "stalks and laterals..." through Column 14, line 13, ending "florets treated with", and delete this second occurrence of such text.

In column 14, line 45, please change "examples" to --Examples--.

Signed and Sealed this

Second Day of November, 1999

Attest:

Q. TODD DICKINSON

Attesting Officer

Acting Commissioner of Patents and Trademarks